(12) United States Patent
Battlogg et al.

(10) Patent No.: US 9,951,840 B2
(45) Date of Patent: Apr. 24, 2018

(54) METHOD AND ASSEMBLY FOR ABSORBING ENERGY FROM LOADS BEING APPLIED DURING AN OVERLOAD EVENT IN ORDER TO PREVENT DAMAGE

(71) Applicant: GENERAL DYNAMICS EUROPEAN LAND SYSTEMS-MOWAG GMBH, Kreuzlingen (CH)

(72) Inventors: Stefan Battlogg, St. Anton I.M. (AT); Markus Mayer, Sulz (AT)

(73) Assignee: General Dynamics European Land Systems-Mowag GmbH, Kreuzlingen (CH)

( * ) Notice: Subject to any disclaimer, the term of this patent is extended or adjusted under 35 U.S.C. 154(b) by 0 days.

(21) Appl. No.: 15/125,664

(22) PCT Filed: Mar. 13, 2015

(86) PCT No.: PCT/EP2015/055364
§ 371 (c)(1),
(2) Date: Sep. 13, 2016

(87) PCT Pub. No.: WO2015/136105
PCT Pub. Date: Sep. 17, 2015

(65) Prior Publication Data
US 2017/0002889 A1  Jan. 5, 2017

(30) Foreign Application Priority Data
Mar. 13, 2014  (DE) .................. 10 2014 103 462

(51) Int. Cl.
*F16M 13/00* (2006.01)
*F16F 9/53* (2006.01)
(Continued)

(52) U.S. Cl.
CPC .................. *F16F 9/53* (2013.01); *B60N 2/24* (2013.01); *B60N 2/4242* (2013.01);
(Continued)

(58) Field of Classification Search
CPC ........... B62D 1/11; B62D 1/195; B62D 1/192
See application file for complete search history.

(56) References Cited

U.S. PATENT DOCUMENTS 3,457,800 A * 7/1969 Suda ...................... B62D 1/192
180/78
3,832,911 A * 9/1974 Daniel ................... B62D 1/192
74/492
(Continued)

FOREIGN PATENT DOCUMENTS

DE  102009000112 A1  7/2010
DE  102012012535 A1  1/2014
WO  2011141164 A1  11/2011

*Primary Examiner* — Amy J. Sterling
(74) *Attorney, Agent, or Firm* — Laurence A. Greenberg; Werner H. Stemer; Ralph E. Locher

(57) ABSTRACT

A method and an assembly for absorbing energy during an overload event. An energy absorber reduces loads on an object being transported on a loading unit during a single overload event, which introduces such a high degree of energy that there is an overwhelming likelihood the object would be damaged without an energy absorber. Measurement values on the current state of the loading unit are sensed. A control device determines an overload event and a damping of the energy absorber is set to a high value after the detection of the overload event. The damping is maintained for a specified prolonged time period and controlled dependent on the measurement values during the overload event to increase the load for objects during the specified time period initially to a specified threshold load and after the specified time dependent on the measurement values detected during the overload event.

14 Claims, 5 Drawing Sheets

Figure 1:
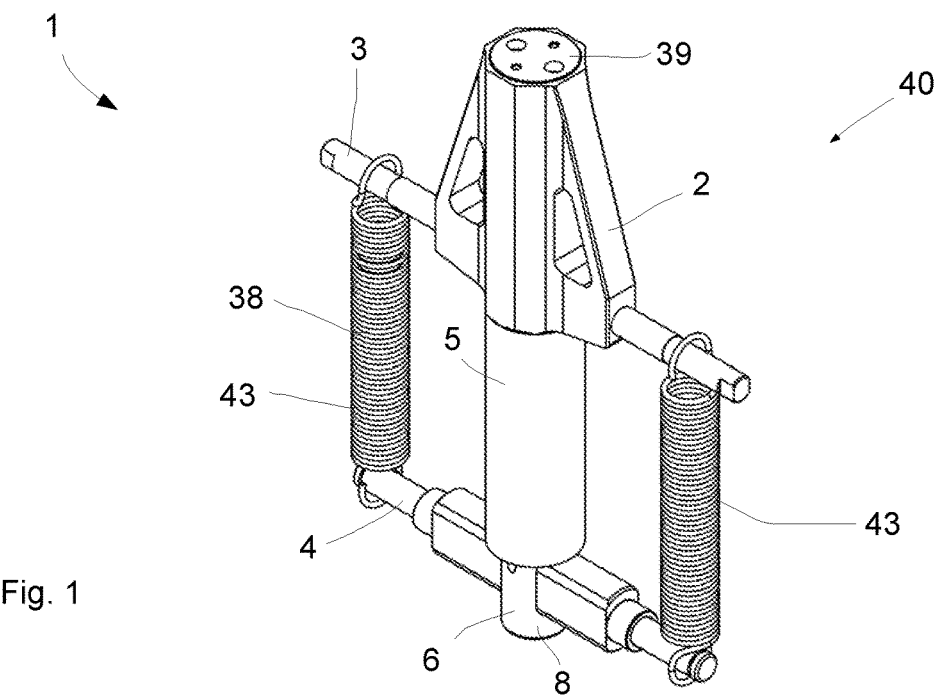

(51) Int. Cl.
*B60N 2/24* (2006.01)
*B60N 2/42* (2006.01)
*B60N 2/427* (2006.01)
*F16F 15/00* (2006.01)
*F16F 7/12* (2006.01)
*B60N 2/50* (2006.01)
*F16F 13/00* (2006.01)

(52) U.S. Cl.
CPC .......... *B60N 2/42709* (2013.01); *F16F 7/127* (2013.01); *F16F 15/002* (2013.01); *B60N 2/50* (2013.01); *F16F 9/532* (2013.01); *F16F 9/535* (2013.01); *F16F 13/007* (2013.01)

(56) References Cited

U.S. PATENT DOCUMENTS

| | | |
|---|---|---|
| 5,558,301 A | 9/1996 | Kerdoncuff et al. |
| 6,919,044 B1 * | 7/2005 | Shibata .............. G01N 35/0092 422/63 |
| 9,126,625 B2 | 9/2015 | Battlogg et al. |
| 9,347,845 B2 * | 5/2016 | Gießibl ................. B60D 1/248 |
| 9,429,485 B1 * | 8/2016 | Cavallaro ................. G01L 1/04 |
| 9,534,732 B2 * | 1/2017 | Johnson ................. F16M 13/02 |
| 2008/0015753 A1 | 1/2008 | Wereley et al. |
| 2008/0156602 A1 | 7/2008 | Hiemenz et al. |
| 2010/0230989 A1 | 9/2010 | Cantor et al. |
| 2011/0035118 A1 | 2/2011 | Hiemenz et al. |
| 2013/0214570 A1 | 8/2013 | Grant et al. |

* cited by examiner

METHOD AND ASSEMBLY FOR ABSORBING ENERGY FROM LOADS BEING APPLIED DURING AN OVERLOAD EVENT IN ORDER TO PREVENT DAMAGE

BACKGROUND OF THE INVENTION

Field of the Invention:

The present invention relates to a method for absorbing or dissipating energy to damp loads during an overload event in particular on a loading unit for transporting objects, in order to protect the objects being transported, such as persons or items, from being damaged. Said single overload event occurs when a mine detonates.

Different methods are known for absorbing energy in order to reduce loads during overload events, such as explosions underneath armoured vehicles, to protect the objects being transported, in particular persons and sensitive devices. Typically, mechanical systems are used for protection which absorb energy by being deformed or torn open in order to absorb energy and protect passengers correspondingly during an overload event.

However, their disadvantage is that with said systems it is impossible to control the damping or energy absorption during an overload event when its impulse intensity and progression are unknown. The intensity and duration of the impulse caused by mine explosions cannot be predicted before the explosion, since the type and power of the mine, the place, its exact positioning, its depth in the soil and the material surrounding the mine are unknown during a real overload event. Monitoring and evaluating the speed of the vehicle or other parameters before the overload event occurs, i.e. before the explosion of a mine, does not enable any estimate to be made about the power of an explosion. Therefore, it is impossible to exactly plan the process of the energy absorption during an overload event before said event occurs.

A method for regulating an energy absorber of a steering column is known in WO 2011/141164 AI, wherein a sensor measures the relative velocity of parts which are movable relative to one another. The energy absorber is then controlled in such a way that the delay is as constant and low as possible, so that the relative velocity of the parts that are movable relative to one another is close to 0 at the end of their movement path. Moreover, this document also indicates the possible use of said energy absorber in safety belt assemblies, mine blast protection seats, bumpers, tool machinery, arresting gear for aircraft landing on aircraft carriers, damping systems for helicopters and damping systems for shoes. Said method, wherein the energy absorber is controlled in such a way that the relative movement of the parts of the energy absorber that are moveable relative to one another is slowed down to 0 at the end of their movement path, can only be carried out if the parameters are known beforehand. If a vehicle on the road drives into the back of a car in front of it, the relative velocity can be directly determined and the entire vertical lift can be optimally used to specifically slow down the relative movement. The same applies to arresting gear for an aircraft landing on an aircraft carrier and even to helicopter crashes, where drop height and drop velocity are known.

Each of the applications makes optimal use of the maximum movement path in order to enable the load to be preferably minimal, e.g. during a car crash, so that the driver experiences the lowest possible force when colliding with the steering column. Such a system works well for regulating the energy absorber in steering columns or in other applications, for which the velocities occurring and consequently the loads are known and, accordingly, the available movement path can be correlated with the current relative velocity.

In applications in mine blast protection seats, for example, when the strength of the explosion is unknown, as it is when a mine explodes underneath an armoured vehicle, said regulation can yield the desired results if the explosion is weak. The forces being applied can be damped and passed on to the body of a person seated on the mine blast protection seat. The load can be reduced considerably. The delay or relative velocity is adjusted so that the load along the movement path is low and constant.

Said method requires knowledge of the initial and marginal conditions. If there are outside influences, the strength and duration of which are initially unknown, the application can lead to correspondingly unexpected results with the damping being too strong or too weak.

BRIEF SUMMARY OF THE INVENTION

The task of the present invention is therefore to provide a method and an assembly for damping, enabling better control during overload events when not all the data needed for ideal control are known before said event occurs.

This task is solved by means of a method for damping with the features as claimed and an assembly with the features as claimed. Preferred embodiments of the invention are detailed in the sub-dependent claims. Further advantages and features result from the general description and the description of the embodiments.

A method according to the invention is used for absorbing energy during an overload event and is carried out in particular with an energy absorber. By absorbing energy, the load on an object being transported on a loading unit is reduced during an overload event.

The energy absorber is in particular suitable in such case to absorb energy during a single overload event with such a high amount of energy being introduced that it is probable or overwhelmingly probable or even almost certain or certain that the object will be damaged, so that said energy absorption by the energy absorber reduces the load on an or the object resulting from an overload event, in order to prevent the object from being damaged. In other words, the energy absorber is preferably suitable to absorb energy during a single overload event introducing such a high amount of energy that without the energy absorber the loads acting on the object being transported would exceed an acceptable threshold value, so that said energy absorption by the energy absorber reduces the load on the object resulting from an overload event.

The method according to the invention in particular involves a sensor device that preferably periodically determines measurement values about the current state of the loading unit. In doing so, the control unit detects an overload event from the recorded measurement values and at least immediately after detecting the overload event, the damping of the energy absorber is set to a considerably high value and in particular to a high value that is closer to a maximum than to a minimum possible value for damping. Said damping set to the considerable or high value is maintained for a specified time period. Preferably, the damping is constant but it can also be not constant when appropriate. The damping can be subject to natural or stochastic variations, e.g. when it should be attempted to avoid a constant value. In any case, during the specified time period, the damping is maintained at the considerable and in particular at the high value. The specified time period is calculated so that during said specified time period a plurality of successive measurement values are detected. After the specified time period, the energy absorber and/or the damping are controlled depending on the measurement values detected during the overload event. This initially causes the load on the objects being transported on the loading unit to be increased up to a specified threshold load and after the specified time period the damping is controlled depending on the measurement values detected during the overload event.

The specified time period is in particular longer than 1 ms and preferably longer than 3 ms and can measure 4 ms, 5 ms, 6 ms, 7 ms or longer.

The method can be carried out in such a way that the damping by the energy absorber is set to the high value at least immediately after the overload event and reduced at a later time, in order to initially increase the load on the objects being transported on the loading unit up to a specified threshold load and then to reduce it. The reduction is carried out in particular to avoid exceeding the threshold load.

The method involves absorbing or converting an impulse or its energy introduced during an overload event in order to reduce the resulting load on an or the object or the object to be transported and prevent it from being damaged by means of the energy absorber absorbing, dissipating or converting the energy.

The method according to the invention has several advantages. One considerable advantage consists of the fact that the damping is set to a high and, in particular, a specified high value after an overload event is detected.

It is also possible to adjust the specified high value beforehand. As an example, it is possible that the high value corresponds to a basic setting and must be actively reduced. At this time, the high damping value is closer to the maximum damping value than to the minimum value thereof. In particular, the high damping value is at least twice or four times further away from the minimum damping value than from the maximum damping value. Therefore, there is only a limited amount of energy being absorbed initially during the specified time period, so that the possible energy absorption is materially or almost entirely or entirely conserved for the time after the specified time period.

Initially, said high value will be approximately or at least materially or exactly maintained after the overload event is detected. In doing so, the spine of a person seated on a loading unit identified as, for example, a seat assembly, is preloaded due to the shock being introduced during the explosion of a mine, since the energy absorber is set to a high or the maximum value.

Any relative movement of the energy absorber is materially suppressed during this process. Therefore, it is easier to regulate the load on the spine, since the initially unloaded spine can be preloaded. The load is initially increased up to a specified threshold load. The load is then maintained around the specified threshold load. After this, the damping of the energy absorber is reduced, in order for a relative movement to occur of the loading unit or seat assembly relative to the frame or body of a means of transport. This achieves that the load on the spine of a user seated on the loading unit is not increased beyond the specified threshold value, but instead remains constant or almost constant.

This method considerably reduces the risk of injury to a user as the object being transported. In conventional mechanical systems, however, energy is immediately absorbed by the mechanical system, until the mechanical system reaches an abrupt end stop. This can lead to unacceptably high loads being passed on to the user's spine. However, the method according to the invention works the opposite way: no energy is absorbed initially and the spine of the user identified as the object is preloaded and then the energy absorber absorbs the energy, since the damping is reduced from the originally high damping value.

Furthermore, the method according to the invention makes optimal use of the possible movement path during particularly powerful overload events. After the mechanical components involved are preloaded, the entire movement path is still available. The mechanical components involved include, for example, the mechanically deformable suspension of the seat assembly.

Said seat assembly is usually fitted with a cushion on the seating surface and/or a sprung seating surface, in order to increase comfort including during normal use. In addition, the spine of a person seated thereon can also be considered to be said mechanical component. The control device only intervenes by controlling or regulating once the mechanical components involved are preloaded.

According to the invention, the damping is in all cases set to a high value closer to the maximum value than to the minimum value when an overload event is detected. The maximum damping is deemed to mean a value at which (at least almost) no relative movement takes place of the parts of the energy absorber that are movable relative to one another for absorbing energy. Starting from said value, any increase in power serves no further purpose. A reduction of power would, however, result in a relative movement of the parts of the energy absorber movable relative to one another for absorbing energy. The high value is preferably adjusted in a way that does not result in a relative movement of the parts of the energy absorber movable relative to one another for absorbing energy.

In all embodiments, the loading unit is formed in particular as a seat assembly for the purpose of transporting persons as the objects. However, it is also possible that loads, animals or sensitive devices or other articles are transported. In an embodiment as a seat assembly, the mounting unit corresponds to the loading unit of the seating surface and the seat assembly is attached to the means of transport using the bearing unit. The loading unit is preferably attached to the means of transport as close to its top as possible. The loading unit can be attached to the means of transport's roof or the upper portion of its lateral wall.

According to this application, damage to an object is deemed to mean a state in which the object was or is at least temporarily altered in a way considered disadvantageous or undesirable. This could be a temporary damage. Permanent or irreparable damage are also possible.

If the object is a person, damage is deemed to mean an impairment to the health of said person. In the case of a person, permanent damage is deemed to mean an at least prolonged impairment of the wellbeing thereof. Damage to an object or a device can be temporary, however, in particular, it is long-lasting and can also be a permanent defect, such as a component being fractured.

Preferably, the control device periodically derives the characteristic parameters of loads on the loading unit or the seat assembly from the measurement values. It is also possible and preferred that the control unit periodically derives the characteristic parameters of loads on an object and particularly a user's spine from the measurement values. This involves in particular determining the characteristic parameters from the measurement values that at least approximately reflect the acceleration of the loading unit. As an example, sensors measuring the path could be provided that detect the respective position in short intervals and derive the current acceleration from the known interval between two measurements. It is also possible to consider individual or a combination of sensors for path and/or power and/or acceleration.

In simple cases, the loading unit is fitted with at least one shear device that is sheared when the load applied to the loading unit exceeds a specified value. An advantage of said shear device is that the vertical lift provided by the energy absorber is completely conserved until an overload event occurs. This leads to the entire vertical lift being available during an overload event, so that even large loads can be damped and their energy can be absorbed.

In preferred embodiments, the control unit recognises an overload event when the shear sensor detects the shear device being sheared. Said embodiment is very easy to execute, since the shear device, such as a shear pin, being sheared can be used as a starting point for the method. As an example, the sensor device only periodically records measurement values when the shear sensor has detected the shear device being sheared. This can be done, as an example, by means of the shear pin providing an electrically conductive connection, the interruption of which initiates the starting signal for periodically recording measurement values.

It is preferred that the control unit detects an overload event when a characteristic parameter exceeds a specified value. Said embodiment works both with and without using a shear device. It is possible that the control unit in said embodiment constantly records measurement values from the sensor device and detects the overload event by means of the value of the derived characteristic parameters. If the measured or detected acceleration of the seat assembly exceeds a certain value, an overload event is detected.

The damping, which is set to a high value before or immediately after an overload event is detected, is preferably maintained for the specified time period after an overload event is detected.

In advantageous embodiments, the damping is reduced to a lower level and/or zero after the specified time period has ended and is then adapted depending on the characteristic parameter or increased again. Doing so enables flexible and optimal control of the load on a person seated on the seat assembly or an object placed on the loading unit. In the case of damage, damping is adjusted to a setting that is sufficiently rigid so that the previously unloaded spine of the user is preloaded. Only then is the damping reduced after the specified time period, so that a relative movement on the energy absorber is made possible. The damping of the energy absorber is then increased and/or reduced according to the characteristic parameter, using the constantly recorded measurement values. This enables, with a specified lift of the energy absorber, the object or user to be prevented from being exposed to unacceptable forces and loads.

It is preferred in all embodiments that the energy absorber is initially damped to the maximum in order to conserve the maximum vertical lift if possible.

It is possible and preferred that after an overload event is detected or the specified time period has ended, the energy absorber is controlled in a time-dependent manner by means of the respective latest characteristic parameter that was derived. This results in an optimal progression of the overload event.

It is possible and preferred that the damping of the energy absorber is reduced when the characteristic parameter reaches or exceeds a specified threshold load for objects, persons, or devices.

In special embodiments, the acceptable threshold load is preferably specified for a standard person. It is possible and preferred that the acceptable threshold load is individually adjusted or determined for objects or users.

It is also possible, in particular, to consider sensor values from a sensor unit placed on a person or an object. In such case, multiple sensor units can be included in order to enhance the reliability of the measurement values and to take more parameters into consideration.

In all embodiments, the loading unit or seat assembly is preferably coupled with at least one sensor means, in order to, as an example, determine the weight of an object or person being transported and/or the acceleration of the seat assembly. The sensor means is in particular part of the sensor device. It is also possible to use flat sensor means on the seating surface of the loading unit or seat assembly that measure several values distributed over the surface. It is preferred in all cases to use an energy absorber with a magnetorheological absorber valve, wherein the level of damping of the magnetorheological absorber valve is controlled according to the strength of a magnetic field applied to the absorber valve.

An assembly according to the invention includes a loading unit for transporting objects and at least one energy absorber for absorbing energy during an overload event, in order to reduce loads on an object being transported on the loading unit. During a single overload event, which introduces such a high amount of energy that without an energy absorber it would be likely or in particular overwhelmingly likely or even almost certain or certain that a load exceeding a threshold value and in particular damage to the object being transported would occur, the energy absorber is suitable and arranged to absorb energy, in order to reduce the resulting load on the object and prevent it from being damaged at the time of or during the overload event by means of the energy absorption of the energy absorber. A control device and at least one sensor device are provided in order to detect measurement values on the current state of the loading unit. At least one energy absorber is provided. The energy absorber can be controlled by the control device according to the measurement values. The control device is formed and equipped to detect an overload event from the recorded measurement values and, at least immediately after an overload event is detected, to set damping of the energy absorber to a considerably high value and in particular a high value that is closer to the maximum adjustable value of the damping than to the minimum adjustable value thereof and to at least approximately or roughly maintain the damping for a specified time period. Said specified time period is calculated so that during this specified time period a plurality of successive measurement values is recorded. After the specified time period, the damping is controlled or can be controlled depending on the measurement values recorded during the overload event, in order to initially increase the load on objects being transported on the loading unit up to a specified threshold load during the specified time period and then to control said load after the specified time period depending on the measurement values recorded during the overload event.

The assembly according to the invention also has many advantages, since it enables the energy absorber to be individually controlled during an overload event. The sensor device is preferably placed on the undamped part of the assembly.

Preferably, at least one sensor unit is provided that can be placed on an object and in particular a person as the object, which can be coupled with the control device by means of a wire or wirelessly. At least one sensor means is preferably provided and coupled to the loading unit, in order to measure the weight of an object being transported and/or the acceleration of the loading unit and/or the force being applied.

The energy absorber is preferably fitted with at least one magnetorheological absorber valve, the damping of which is controlled according to the strength of a magnetic field acting on the absorber valve.

The loading unit can in all cases be fitted with a shear device that can be sheared when the load on the loading unit exceeds a specified value.

The control method can in all cases be programmable. The method can be adapted to different frames or seat frames. The regulation can be optimised according to the threat scenario or risk potential. It is also possible to variably adapt it to the assembly situation, e.g. when the possible vertical lift is altered or when components are altered or fitted at a later time.

In all embodiments, the damping is preferably controlled by the flow of current in an electric coil provided for generating a magnetic field. This involves initially generating a very strong force, which results in the spine of a person as the object and any seat cushions and/or springs and similar elements possibly provided being preloaded. Doing so achieves a preferably short movement path until the whole system is preloaded and the spine has reached a certain and specified force. This is followed by the force being rapidly reduced, in particular before the maximum acceptable spinal force is reached. Said rapid reduction of the force is preferably achieved by switching off the connected electric current. By rapidly reducing the force, the force or load is prevented from overshooting. The load or spinal force is then preferably maintained until the first disruptive event of the overload event has ended. This reliably prevents the system from bottoming out in most of the possible cases.

It is possible in all embodiments that an additional comfort function is provided, wherein part of the vertical lift or the movement path of the energy absorbers is used for suspension and damping of minor impacts and increasing comfort. This can possibly involve a central control, wherein an adjustable proportion of the entire path is available for the comfort function. This means that the entire movement path is available for overload events when there is a high risk potential, whereas in safe situations a larger proportion of the movement path is available for damping to increase comfort.

It is also possible to enable the seat height to be adjusted in an embodiment as a seat assembly. This can offer increased safety for smaller or lighter persons because a longer movement path is available.

In all embodiments, in the case of persons as the object, regulation is preferably carried out according to the measured and estimated spinal force. The force being applied to the spine should not be greater than 4000 N.

In further embodiments, two successive and connected disruptive events of an overload event are damped. As an example, the first disruptive event is the direct effect, i.e. when the armoured vehicle is initially launched into the air by the explosion. The effects are damped accordingly. The vehicle then hits the ground. This is the second disruptive event of the overload event and it is also damped. Therefore, an automatic resetting of the energy absorber to its initial position is preferably provided.

In all cases, the loading unit is in particular formed as a seat assembly of a vehicle or motor vehicle. The seat assembly comprises a mounting unit formed as a seat and a bearing unit formed as a seat frame. The energy absorber is mounted between the seat and the seat frame.

According to the present invention, a single overload event is preferably deemed to mean the explosion of a mine. In particular, other single overload events involving energy being introduced can also be considered according to the invention, for which, in particular, the strength and duration of the impulse cannot be estimated based on previous measurement values. Said single overload event can also occur, as an example, in run-off-road collisions of a vehicle, e.g. when the driver loses control and the vehicle unexpectedly and unpredictably crashes down, for example, an embankment or similar. In said collisions, the force of the energy being introduced during the overload event cannot be derived from the velocity of the vehicle but instead depends on the drop height which, however, cannot be derived from, for example, the velocity of the vehicle.

With the present invention it is therefore also possible and preferred to protect or reduce loads on the passengers of a motor vehicle in so-called "run-off-road" accidents, which, for example, in the USA, are responsible for 50% of traffic deaths.

Departures of road vehicles such as cars, SUVs, lorries etc. from an asphalt roadway due to distraction, tiredness, or adverse weather conditions are a frequent occurrence. Vehicles with an assembly according to this invention are preferably fitted with a seat construction including a seat and a seat frame, wherein the energy absorber described above in particular absorbs the vertically or materially vertically applied impact energy to a large extent. In order to prevent the passengers' spines being dangerously injured, at least one energy absorber is placed between the seat and the seat frame so that the forces vertical forces are absorbed and/or the forces are absorbed parallel to the back rest of the seat and/or the forces are absorbed in a right angle to the seating surface. Said forces are generated during a forceful (at least partially vertical) impact of the vehicle off the roadway. In said overload events, the energy to be absorbed is applied in a considerable proportion or to a large extent or almost entirely in a vertical direction.

The invention is not primarily provided to absorb energy during a frontal impact. However, for level, frontal impacts crumple zones or airbags are provided in the vehicle.

The strength of vertically applied loads during overload events and accidents when departing from the roadway or the strength of vertical loads during mine explosions cannot, however, be derived from parameters prior to the overload event, since they cannot be estimated or measured.

The energy absorber can in all cases be fitted vertically, horizontally or obliquely.

In the state of the art, however, a sensor in motor cars detects the vehicle departing from the roadway and activates the relevant safety systems, such as the seatbelt pretensioner. However, the severity of the collision and the optimal load reduction resulting therefrom cannot be derived from said sensor. What is important is what happens after the vehicle has departed from the roadway, where and how it lands or with what kind of surface it comes into contact and in which position in space the car is at the moment of impact. The method according to the invention involves reacting to the impact/impulse in the manner described above and below, resulting in a material improvement over, or reduction of injury compared with the state of the art.

BRIEF DESCRIPTION OF THE SEVERAL
VIEWS OF THE DRAWING

Further advantages and features of the present invention can be seen from the description of the embodiment examples that are explained below with reference to the attached figures.

Figure 2:
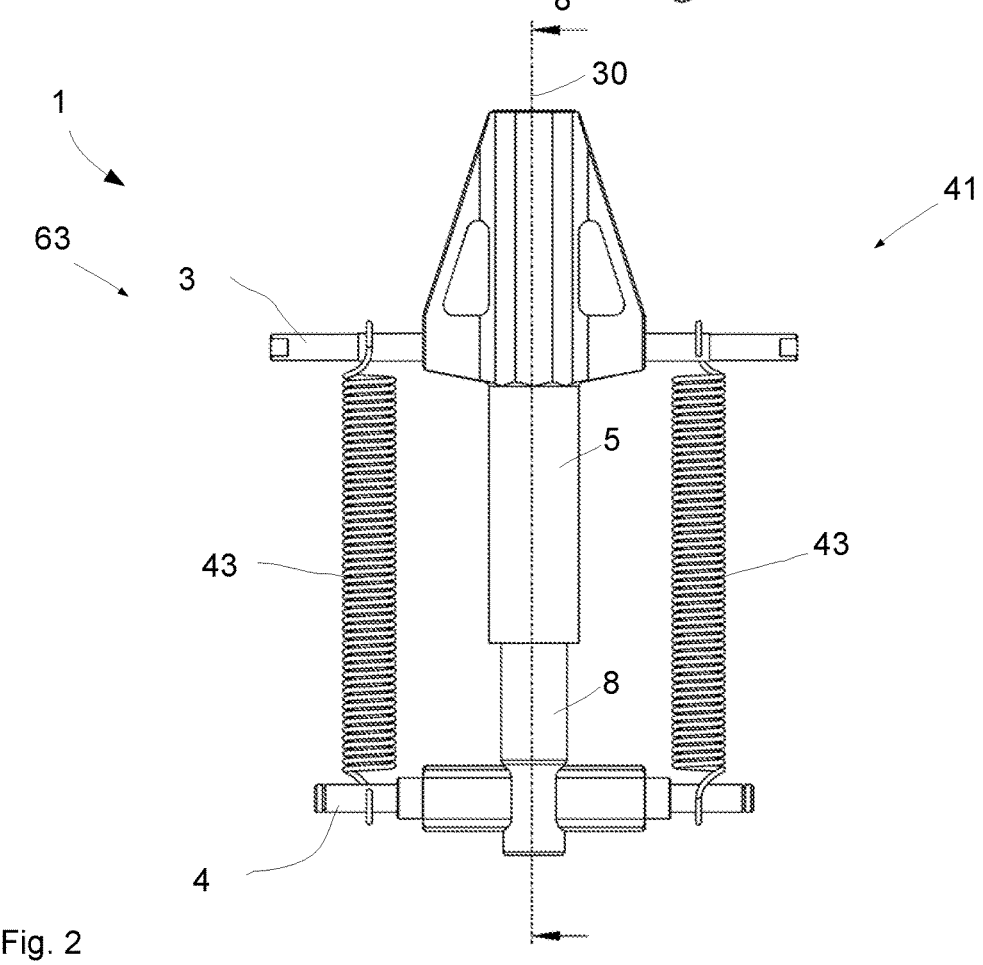
Figure 3:
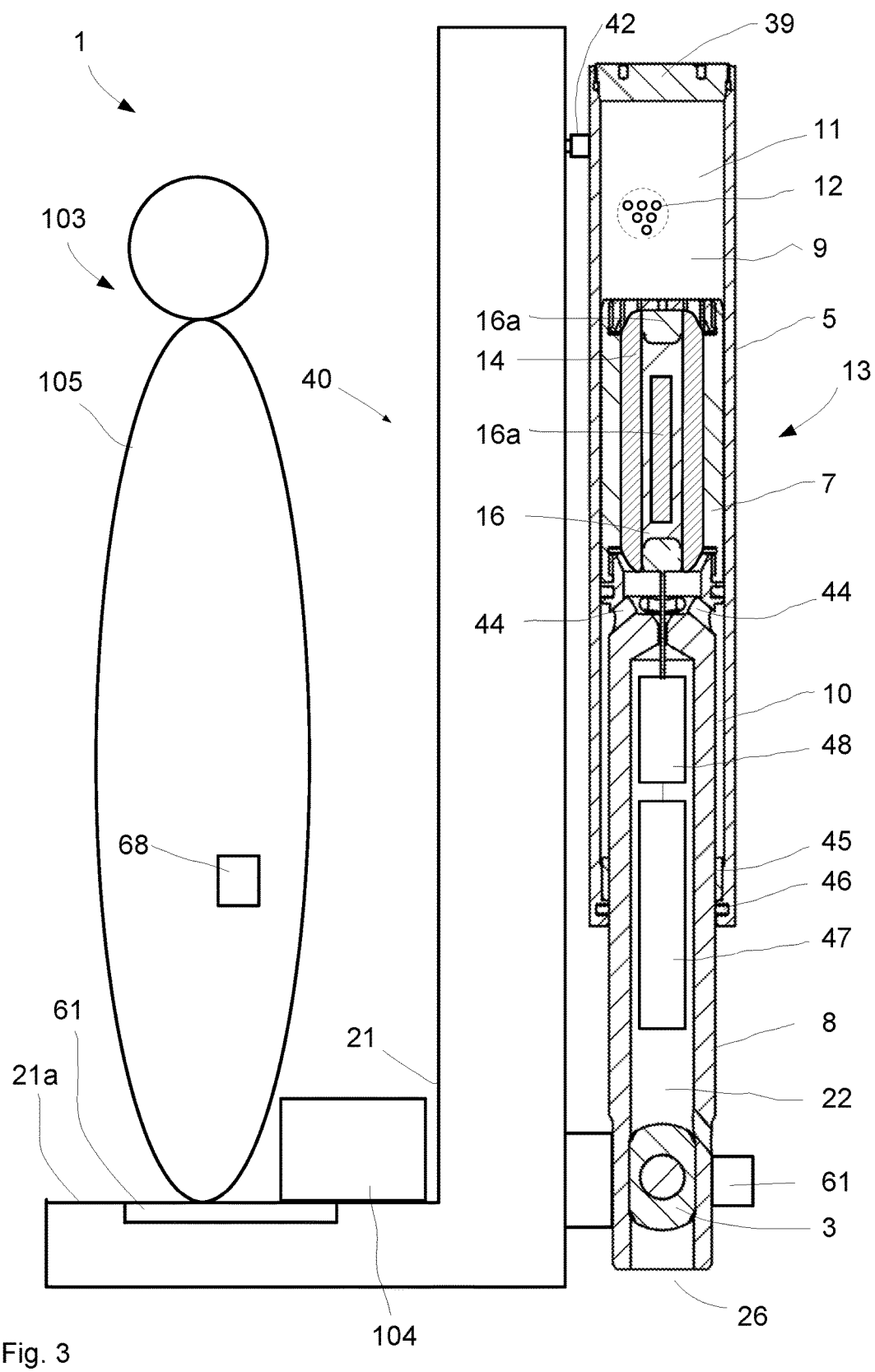
Figure 4:
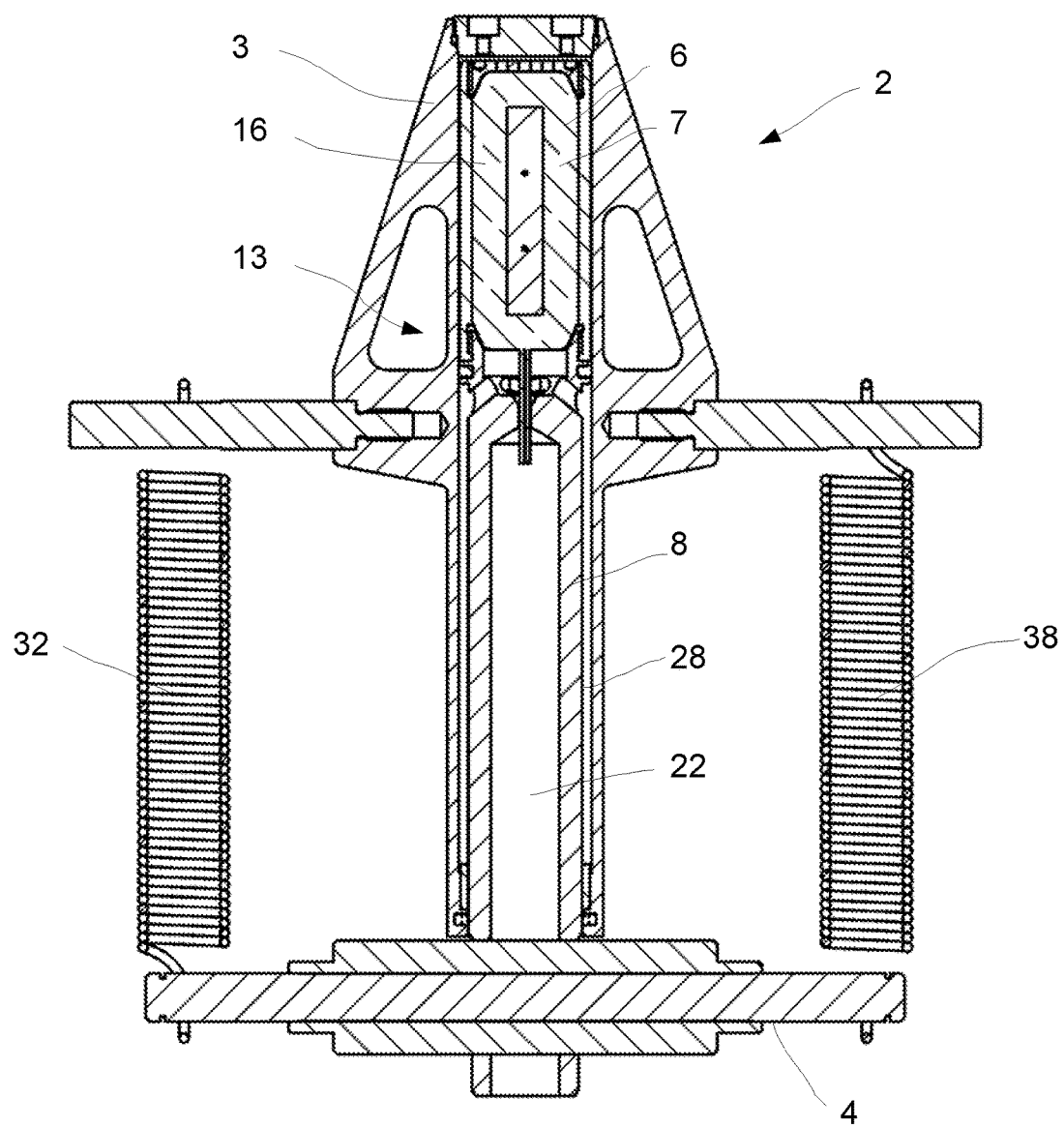
Figure 5:
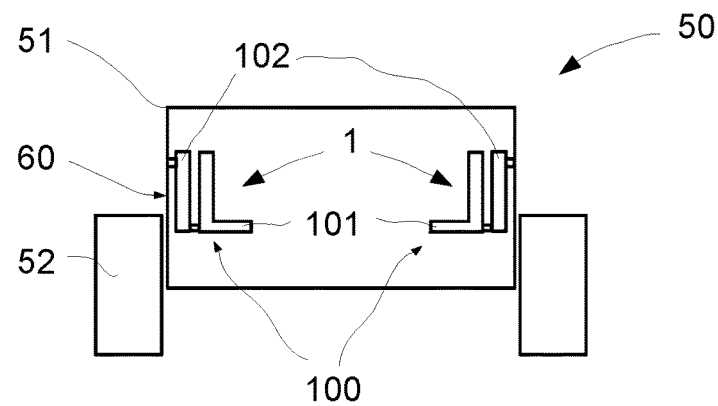
Figure 6:
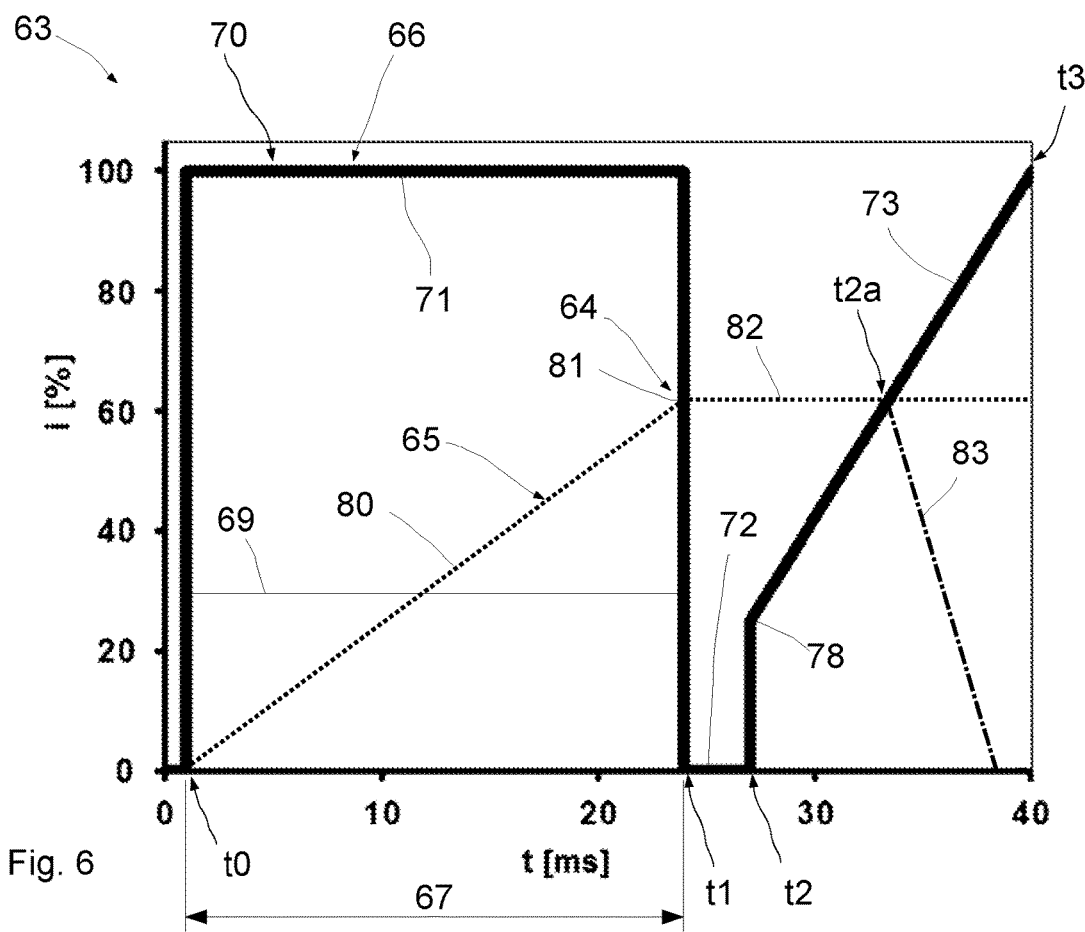
Figure 7:
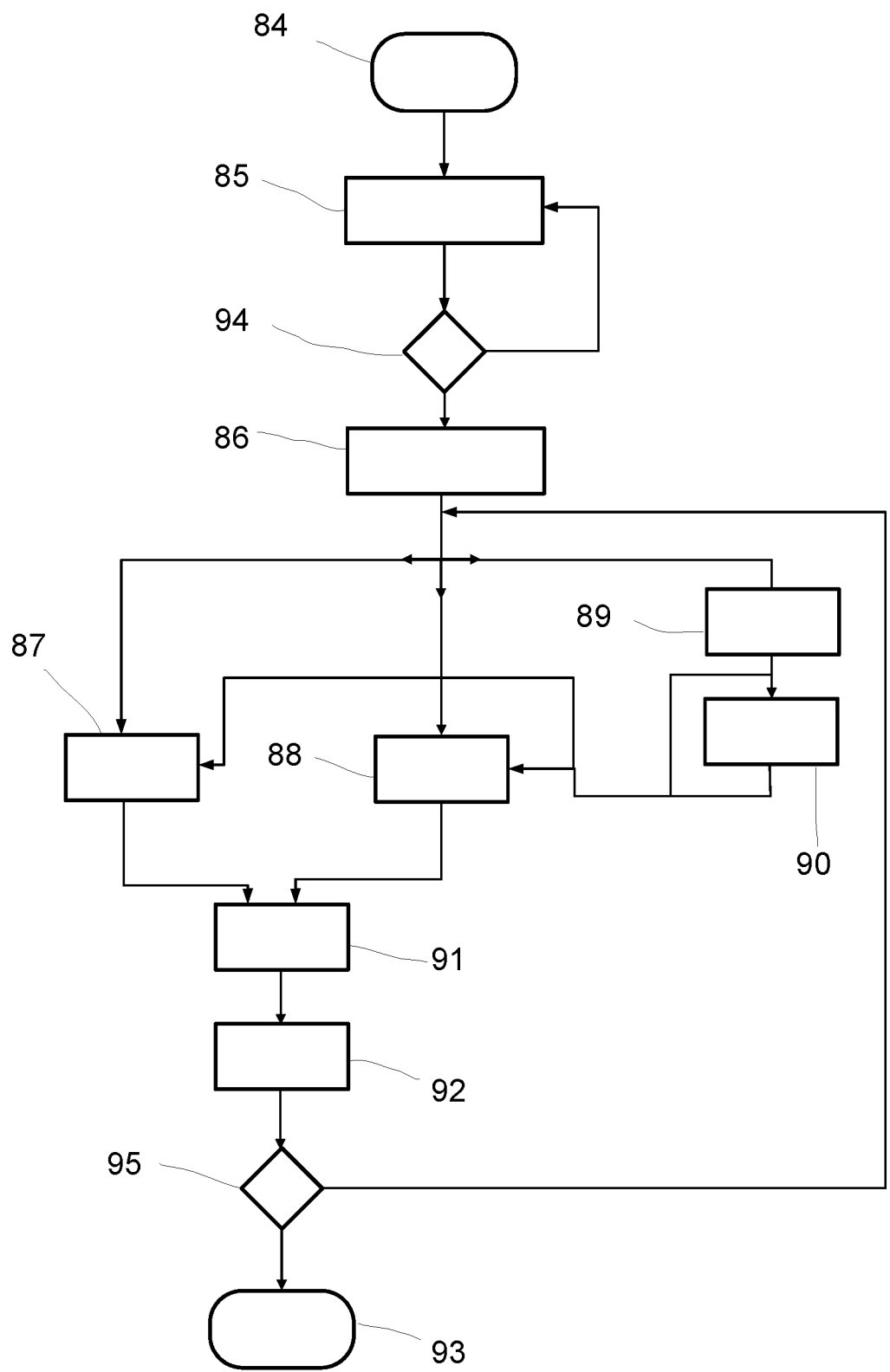

The figures show:

FIG. 1 a schematic perspective view of an assembly according to the invention;

FIG. 2 a front view of the assembly according to FIG. 1;

FIG. 3 a side section of the assembly according to FIG. 1 in the damping state;

FIG. 4 a front section of the assembly according to FIG. 1 in the resting state;

FIG. 5 a vehicle with assemblies according to the invention for protecting passengers from explosions;

FIG. 6 a chronological sequence of a damping force of the assembly according to FIG. 1 during an overload event; and FIG. 7 a schematic flowchart of the assembly's control during an overload event according to FIG. 6.

DESCRIPTION OF THE INVENTION

FIG. 1 shows a schematic perspective view of an assembly 1 according to the invention. The assembly comprises an absorber cylinder 5, on one end of which an attachment device 3 and on the other end of which a retention device 4 is provided. The retention device 4 and the attachment device 3 each have two laterally protruding arms, with a preloading spring 43 of a preloading device 38 placed on either of them, in order to reset the assembly after an overload event 63 to the resting state 40, which is also shown in FIG. 1.

The assembly 1 is provided to absorb energy or damp relative movements between the attachment device 3 and the retention device 4. For such purpose, the retention device 4 is connected with the piston device 6 of the energy absorber, while the attachment device 3 is securely connected with the absorber cylinder 5. At the upper end, an end cap 39 can be seen that closes off from the outside and limits the second chamber of the absorber chamber 9 concealed in the interior. The assembly 1 is in particular inserted in a loading unit 100 between a mounting unit 101 and a bearing unit 102 (see FIG. 5).

FIG. 2 shows the assembly 1 in a front view. A symmetry axis 30 extends centrally through the absorber cylinder 5, the section in FIG. 3 running through said symmetry axis.

FIG. 3 shows a section according to FIG. 2 in a resting state 40. In addition, a seat assembly 21 is schematically shown as a loading unit 100. The loading unit 100 has a mounting unit 101 or seating surface 21a, on which an object 103 such as a person 105, e.g. a soldier in a personnel carrier, can be seated.

In the interior of the absorber cylinder 5, the section shows the absorber piston 7 and the piston rod 8 of the piston device 6 connected therewith. The absorber piston 7 divides the absorber chamber 9 located in the interior of the absorber cylinder 5 into a first chamber 10 and a second chamber 11. The second chamber 11 is limited from the outside by the end cap 39 and sealed airtight.

In the resting state, the first chamber 10 is at least partially and in particular entirely filled with absorber fluid 12. When an overload event 63 occurs, the piston rod 8 is retracted from the absorber cylinder 5, so that the absorber fluid 12 in the first chamber 10 passes through the absorber channel 14 in the absorber piston 7 and into the second chamber 11. In the resting state, the second chamber 11 can already be filled to a certain extent with absorber fluid 12. However, it is also possible that in the resting state, the second chamber 11 is filled with only little absorber fluid 12 or none at all, but with air or another compressible gas or medium.

It is clearly visible that the piston rod 8 has a very large diameter, so that for the first chamber 10 only a relatively small annular gap remains around the piston rod. Thus, when the absorber piston 7 is extended, only a relatively small volume of absorber fluid 12 is displaced from the first chamber 10. Therefore, the flow velocities of the absorber fluid 12 in the absorber channel 14 remain low even during overload events 63 caused by explosions, so that the length of the absorber pistons 7 is sufficient to influence the flow as desired using the magnetic field of the electric coil as the field generation device 16.

When the flowing fluid 12 passes from the first chamber 10 into the second chamber 11, the absorber fluid 12 is diverted towards the interior by the radial flow openings 44 that radially obliquely extend towards the interior from the outside. This means that the flow channel or absorber channel 14 is radially placed further inside than the first chamber 10. This enables the effective use of the interior of the absorber piston 7 for generating the required magnetic field and for the absorber channel 14.

The piston rod 8 is shown here with a considerably greater thickness than would be necessary for ensuring stability. Therefore, an empty space 22 is provided in the piston rod 8, which is shown here as a blind hole. The blind hole 22 extends from the end 26 opposite the piston into the piston rod 8. The empty space 22 can extend up to just in front of the absorber piston 7, so that the length of the empty space 22 extends over three-quarters or more of the length of the piston rod 8 up to the absorber piston 7. The empty space 22 can be used accordingly. The control device 48 and an energy device 47 are located here in the interior of the empty space 22. The control device 48 is connected to the electric coil 16, in order to control it. Moreover, the control device 48 is connected to a sensor device 61 in order to accept and process the load on the loading unit 100 identified as a seat assembly 21.

The energy storage device 47 ensures that even in the event of a loss of power on board the means of transport, the assembly 1 holds sufficient energy to control the energy absorber 2. The energy storage device can be a capacitor or a rechargeable battery.

The absorber piston 7 not only separates the first chamber 10 from the second chamber 11, but also forms a flow valve 13, which can be controlled by means of the control device 48.

FIG. 4 shows another cross section of assembly 1, whereas in this case it also shows the preloading device 38 as the resetting device 32 to 43 in section. For the sake of clarity, the energy storage device 47 and the control device 48 in the empty space 22 are not shown in this figure. The first chamber 10 forms an annular gap 28 around the piston rod 8. In this case, a radial extension of the annular gap 28 is smaller of than the wall thickness of the hollow piston rod 8.

FIG. 5 shows a schematic view of a means of transport 50, such as a personnel carrier, provided with assemblies 1 according to the invention, in order to protect the passengers during explosions. The means of transport 50 has a body 51, with mine blast protection seats 60 attached thereto as assemblies 1. The vehicle 50 can be driven using wheels with tyres 52. During an overload event 63, e.g. an explosion, the vehicle 50 is launched into the air, a damped movement occurs of the loading unit 100 of the assemblies 1 which, identified here as a seat assembly 21, in order to protect the persons seated on it from permanent damage.

FIG. 6 shows the chronological progression 70 of the relative adjusted electric current of the energy absorber 2 during an overload event 63. Said overload event occurs, as an example, when an armoured personnel carrier moves over a land mine and said mine detonates.

The overload event 63 is detected, for example, when the shear pin of the shear device 42 is sheared, because the load being applied to it exceeds the shear force. This results in the electrically conductive contact being interrupted by the shear device 42, which is detected by the control device 48. A corresponding control sequence is then activated. This point in time is designated t0.

Alternatively, or additionally, the control device 48 can also run an alternative routine for detecting an overload event. The control device 48 can also poll and evaluate the respective current measurement values in certain intervals from the sensor device 61 and the sensor unit 68 and further sensor means, to periodically derive a parameter 65 from a single measurement value from one sensor or multiple measurement values from different sensors. The parameter 65, as an example, can be determined every 10 ms or other suitable intervals. After an overload event 63 is detected, it is preferable that a shorter interval be selected.

At the point in time to, a strong electric current is directly applied to the electric coil 16. In particular, the maximum possible current is immediately applied to the electric coil 16, in order to preferably immediately block the energy absorber 2. The magnetic field generated by the electric coil 16 chains up the magnetorheological particles in the magnetorheological absorber fluid 12 within the absorber channel 14. In order to force the absorber fluid 12 through the absorber channel 14, the force being applied must be sufficiently great so that the chained up magnetorheological particles (reversibly) shear off. The maximum force is therefore adjusted in such a way that during an overload event it is normally also sufficient to prevent the relative movement of the retention device 4 relative to the attachment device 3. The electrical current remains at 100% for a pre-set time period 67. The length of the specified period 67 can be pre-set, however, it can also be variable depending on, for example, the weight of the person 105 seated on the seat assembly 21. It is also possible that the weight of a device 104 as the object 103 is recorded and taken into consideration. By such means, the forces being applied can be determined for a detected acceleration. In many cases, an acceptable maximum force may not be exceeded. The force is calculated as the product of acceleration and mass.

The specified period 67 is preferably chosen based on measurements, calculations and experience in a way that within said period 67, the load on the back or the spine of a typical person is not exceeded in the case of damage 63. The previously unloaded spine of a person 105, seated on the seat assembly 21, is then preloaded during an overload event 63. Likewise, various springs and cushions of the seat assembly 21 and mechanical components acting as springs are also preloaded. If articles 104 are being transported, this will be taken into consideration accordingly, in order to enable the protection of sensitive devices during transport.

After the time period 67 has ended, the load on the person at the point in time t1 may have reached the maximum specified load threshold 81. At the same time, the threshold load 64 is also reached, which may not be exceeded. In order to achieve optimal control, the electrical current of the electric coil 16 is heavily reduced down to a reduced value 72. In particular, the electric current of the electric coil 16 is abruptly reduced to zero. This prevents the load progression 80 from overshooting.

Initially, the load progression 80 rises rapidly and then reaches a plateau 82. The energy absorber 2 now allows a relative movement of the seat assembly 21 to the body 51 of the vehicle 50. At the point in time t2, the electric current is first increased to the value 78 and from that moment on the current of the electric coil 16 progresses in a ramp-like manner. The damping increases correspondingly, so that the movement speed of the absorber piston 7 is reduced and the load is maintained at the high plateau 82. By this method, the load is constantly maintained as high as is acceptable. This ensures that the largest possible reserves remain available at all times, in order to damp the overload event without any permanent damage to a person seated on the mine blast protection seat. If an energy absorber or damper abuts, the load increases abruptly and can continue to increase beyond acceptable thresholds. The invention significantly reduces risks of injury. At the point in time t3, the overload event is over and the current is switched off again.

During the time interval starting at the point in time t1, the damping is controlled in a regulated manner. For this purpose, the measurement values from the sensors 61 and 68 are periodically retrieved. A parameter 65 is periodically derived from the measurement results, which is used for subsequent control. A current load is derived from the parameter 65, if the parameter does not directly reflect the current load. By means of the current load the electric current is controlled so that the load is preferably maintained just under the threshold load 64 and preferably does not exceed it.

If it is detected that the maximum load of the overload event has been exceeded, the damping can be adjusted to a softer setting in order to increase comfort.

FIG. 6 additionally contains a dot-dashed line 83 that reflects a different load progression. The progression of the line 83 also begins at the point in time t0, when an overload event 63 is detected. The electric current is increased to 100% once again and at the point in time t1 it is reduced to zero. At the point in time t2, the electric current is increased up to the value 78 and subsequently, it is increased in a ramp-like manner (73) until the point in time t2a. The load then decreases, so that the damping can be adjusted to a softer setting and the electric current can be reduced.

In one version, the parameter 65 is periodically determined at least from the point in time t0 also during the specified period 67 at its respective current value. Control is then carried out at all times by means of the respective determined parameter 65, until, for example, it falls back below an overload event threshold 69.

If no shear device 42 is provided, the overload event threshold 69 can also be used as the threshold for detecting an overload event 63. For loads smaller than the overload event threshold 69, the energy absorber can be used in a comfort function and absorb minor impacts. A certain proportion of the vertical lift may be reserved for overload events. The proportion reserved can be dependent on the current level of hazard.

FIG. 7 shows a highly schematic representation of a control progression in a specific embodiment. The process is initiated at the starting point 84. In this case, for example, the shear device 42 is polled in an endless loop in order to detect an explosion. If an explosion or similar disruption was detected during step 85, the endless loop is interrupted at the branching 94 and the control 48 is initialised. This is carried out in step 86. At this time, the control algorithm 87 is also caused to then apply the maximum damping 66 or 71 to the energy absorber during the specified time period 67. Said time period 67 is used to preload all (mechanical) components involved, including the object 103. Starting from the point in time t0 and in particular after the time period 103 has ended, characteristic parameters 65 are periodically derived from measurement values from measurement 89 in a parameter determination 90. The parameters 65 and, in this case, also the measurement values themselves are passed on to the regulation algorithm 88. The regulation algorithm 88 passes on the data and a control variable is calculated in step 91. In order to calculate the control variable and, in this case, the value of the current, data from the control algorithm 87, which is also provided the measurement values, are used in addition. Finally, the actor in step 92 is powered. The control circuit is then run through again, then returning to step 88. At this time, the current measurement values are received. The actual value is compared with the desired value and re-adjusted when appropriate. If it is detected during step 95 that the overload event or explosion has ended, the end 93 of the control is initiated by means of the branching 95. The end 93 can lead directly back to the start 84, in order to detect further disruptions.

In all embodiments, the object being transported on a loading unit can be directly or indirectly coupled on and/or with the loading unit and/or placed thereon. The connection can be permanent and/or releasable. Or, the object is placed on the loading unit and held in place by the force of its weight.

LIST OF REFERENCE NUMERALS

| | |
|---|---|
| 1 | assembly |
| 2 | energy absorber |
| 3 | attachment device |
| 4 | retention device |
| 5 | absorber cylinder |
| 6 | piston device |
| 7 | absorber piston |
| 8 | piston rod |
| 9 | absorber chamber |
| 10 | first chamber |
| 11 | second chamber |
| 12 | absorber fluid |
| 13 | absorber valve |
| 14 | absorber channel |
| 16 | electric coil |
| 16a | permanent Magnet |
| 21 | seat assembly |
| 21a | seating surface |
| 22 | empty space (in 8) |
| 25 | wall |
| 26 | end |
| 28 | annular gap |
| 30 | symmetry axis (from 5, 8) |
| 32 | resetting device |
| 38 | preloading device |
| 39 | end cap |
| 40 | resting state |
| 41 | absorber state |
| 42 | shear device |
| 43 | preloading spring |
| 45 | guide bushing |
| 46 | seal |
| 47 | energy storage device |
| 48 | control device |
| 50 | means of transport, vehicle |
| 51 | body |
| 52 | tyre |
| 60 | mine blast protection seat |
| 61 | sensor device |
| 62 | measurement values |
| 63 | overload event |
| 64 | threshold load |
| 65 | parameter |
| 66 | predetermined amount |
| 67 | specified time period |
| 68 | sensor unit |
| 69 | overload event |

-continued

| | |
|---|---|
| | threshold |
| 70 | electric current progression |
| 71 | maximum amount |
| 72 | reduced amount |
| 73 | ramp |
| 80 | load progression |
| 81 | maximum load |
| 82 | plateau |
| 83 | decreasing load |
| 84 | start |
| 85 | detection of explosion |
| 86 | initialisation |
| 87 | control algorithm |
| 88 | regulation algorithm |
| 89 | measurement |
| 90 | parameter determination |
| 91 | determining control variable |
| 92 | applying current to actor |
| 93 | end |
| 94 | branching |
| 95 | branching |
| t0 | point in time |
| t1 | point in time |
| t2 | point in time |
| t2a | point in time |
| t3 | point in time |
| 100 | loading unit |
| 101 | mounting unit |
| 102 | bearing unit |
| 103 | object |
| 104 | article |
| 105 | person |

The invention claimed is:

1. A method for absorbing energy during an overload event using an energy absorber in order to reduce loads on an object being transported on a loading unit, the method comprising:
   providing an energy absorber that is suitable for absorbing energy during a single overload event, which introduces such a degree of energy into the loading unit that would cause the object to be damaged without an energy absorber, in order to reduce the resulting load on the object during the overload event by way of the energy absorption of the energy absorber, the energy absorber having a maximum value of damping and a minimum value of damping;
   detecting measurement values with a sensor device about a current state of the loading unit;
   receiving the measurement values in a control device and determining an overload event from the recorded measurement values; and
   at least immediately after the overload event is detected, setting a damping of the energy absorber to a relatively high value that is closer to the maximum value than to the minimum value and maintaining the damping for a specified time period;
   setting the specified time period such that during the specified time period a plurality of successive measurement values are detected, and controlling the damping after the specified time period dependent on the measurement values detected during the overload event, in order to initially increase the load on the object being transported on the loading unit up to a specified threshold load during the specified time period and, after the specified time period, to control the load in dependence on the measurement values detected during the overload event.

2. The method according to claim 1, wherein the control device periodically derives characteristic parameters for a load on the loading unit from the measurement values.

3. The method according to claim 1, which comprises providing a shear device in the loading unit, which is sheared off when the load being applied to the loading unit exceeds a predetermined amount, and wherein the control device detects an overload event when a shear sensor detects the shear device being sheared.

4. The method according to claim 1, wherein the control device detects an overload event when a characteristic parameter exceeds a predetermined amount.

5. The method according to claim 4, which comprises reducing the damping to a lesser value of the damping immediately after the specified time period, and then controlling the damping in dependence on the characteristic parameter.

6. The method according to claim 1, which comprises maintaining the damping at the relatively high value beyond the specified time period.

7. The method according to claim 1, which comprises setting a damping of the energy absorber during the specified time period after an overload event is detected to the maximum value.

8. The method according to claim 1, which comprises, after the specified time period has ended, controlling the energy absorber time-dependently in dependence on the respective currently derived characteristic parameter.

9. The method according to claim 1, which comprises reducing the damping of the energy absorber when the characteristic parameter reaches or exceeds a specified threshold load.

10. The method according to claim 1, wherein the acceptable threshold load is predetermined for a person.

11. The method according to claim 1, which comprises taking into consideration sensor values of a sensor unit located on the object.

12. The method according to claim 1, wherein a sensor device is coupled with the loading unit, in order to determine a weight of an object being transported and an acceleration of the loading unit.

13. The method according to claim 1, which comprises providing for a comfort function and damping minor impacts below an overload event threshold.

14. The method according to claim 1, wherein the energy absorber has an absorber valve, and the method comprises damping the absorber valve by way of a strength of an applied magnetic field.

* * * * *